United States Patent [19]

Oshima

[11] 3,932,247

[45] Jan. 13, 1976

[54] METHOD OF MAKING THERMOPLASTIC RESIN MATTINGS

[76] Inventor: Yasuhiro Oshima, c/o Meiwa Gravure Chemical Co., Ltd. 860, Kashida, Higashi Osaka, Osaka, Japan

[22] Filed: Mar. 20, 1973

[21] Appl. No.: 342,933

Related U.S. Application Data

[63] Continuation of Ser. No. 88,693, Nov. 12, 1970, abandoned.

[30] Foreign Application Priority Data

Sept. 25, 1970 Japan ............................... 45-95593

[52] U.S. Cl. ................ 156/148; 156/178; 156/181; 156/251; 428/64; 428/81; 428/238; 428/257

[51] Int. Cl.$^2$ .................... B32B 27/12; B32B 31/18; B32B 5/02; D03D 25/00

[58] Field of Search ........... 156/166, 176, 178, 181, 156/251, 179, 148; 161/42, 90, 70–71, 84, 44

[56] References Cited

UNITED STATES PATENTS

| | | | |
|---|---|---|---|
| 2,787,570 | 4/1957 | Lott et al. | 161/90 |
| 2,827,414 | 3/1958 | Bussard et al. | 161/84 X |
| 2,836,529 | 5/1958 | Morris | 161/90 X |
| 2,966,437 | 12/1960 | Loui et al. | 161/42 |
| 3,444,025 | 5/1969 | Hillas | 156/178 X |
| 3,713,942 | 1/1973 | Kim | 156/181 X |

*Primary Examiner*—Philip Dier

*Attorney, Agent, or Firm*—Toren, McGeady and Stanger

[57] ABSTRACT

Thermoplastic resin mattings containing plastic rods fastened one above another with plastic strings to form an ornamental screen, which screen is covered with a plastic transparent sheet whereby they are both partially glued and cut by heat pressure to define the contour thereof and at the same time provide any desired three-dimensional designs on the ornamental screen portions, thus providing the manufactured goods with high impact-resistance, convenience in use, the sense of being thick and heavy and superiority in ornamental effect.

5 Claims, 8 Drawing Figures

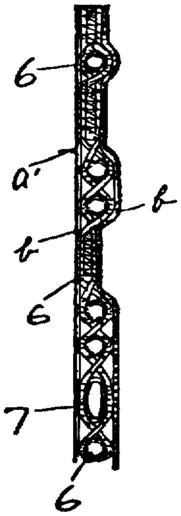
Fig. 7
Fig. 8
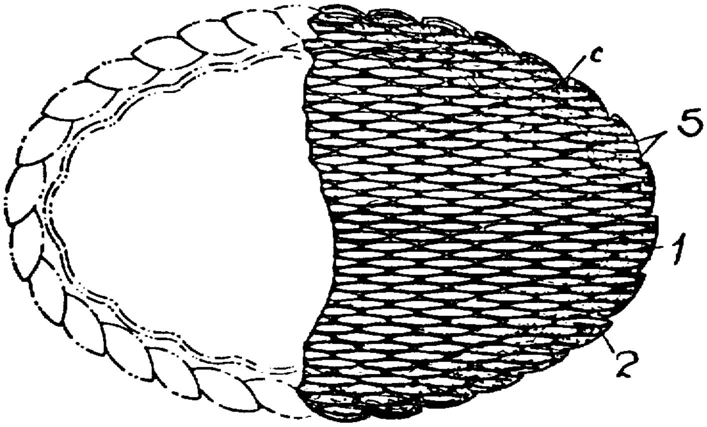

METHOD OF MAKING THERMOPLASTIC RESIN MATTINGS

This is a continuation of application Ser. No. 88,693 filed Nov. 12, 1970 now abandoned.

SUMMARY OF THE INVENTION

The present invention relates to an improvement of thermoplastic resin matting and more particularly to an improved type of thermoplastic resin doily or so-called luncheon mat.

Conventionally it is customary to produce luncheon mats for example by constructing the surface thereof with a thermoplastic resin sheet and constructing the reverse thereof with a rubber sheet or a blistered thermoplastic resin sheet. However, such conventional types of luncheon mats are intrinsically short of durability with protracted use, being apparently light in weight and devoid of richness in designs upon the whole. Moreover, since the luncheon mats are to be produced by sticking the surface and reverse thereof respectively to said sheets by means of a binding agent, and cutting the outer periphery thereof into any desired shape by means of a cutting device in the following process, these steps are inevitably accompanied with the disadvantages that the manufactured goods are made excessively complicated in the process of manufacture and consequently cost very much as an article of trade.

From the viewpoint of the above-mentioned disadvantages, the present invention aims at providing a method of producing such luncheon mats in which a plurality of hollow or solid rods made from a thermoplastic resin material are drawn up in a line and fastened closely one above another with thermoplastic resin strings or threads positioned at pre-determined intervals in the direction traversing the rods thereby to form a screen or base member which may be used to economically produce therewith such luncheon mats that are sufficiently thick and sturdy to be useable over a long space of time.

Incidentally, the base member thus formed is superior in an aethetic sense of design suitable for decoration so that it can serve to enhance the ornamental effect of luncheon mats.

Further according to the method of this invention, at least one side of the base member where the designs are printed is covered with a transparent thermoplastic resin sheet whereby the object can be seen through the sheet and at the same time protected from exterior impacts so as to be fit for long service.

As has been mentioned, the base member and the plastic sheet in accordance with the present invention are both made from a thermoplastic resin material or such a resin material in combination and they are thermally adhered to each other under pressure without using a binding agent thereby supplying a low-cost manufacture of a luncheon mat in a very simple manner.

Further even in this case, they are thermally adhered in their partially limited portions only which enable desired designs to be printed on the surface of the finishing matting. Moreover, in synchronism therewith, the portion which makes the contour of a luncheon mat is thermally cut so that the process of manufacture is excessively simplified, being set free from the conventional disadvantages of cutting the contour portion by means of an independently provided cutting machine and thereafter removing the marginal portions clearly from the luncheon mat.

It is therefore one of the main objects of the invention to mass-produce sturdy luncheon mats superior in designs and low in price that are apparently thick and heavy.

It is another object of the invention to provide such thick and heavy luncheon mats full of elasticity by drawing up a plurality of thermoplastic resin strings or threads thereby to form a finished matting usable for ornamental purposes.

Further it is another object of the invention to provide such luncheon mats by covering one side or both sides of the base member with a transparent or semi-transparent thermoplastic resin sheet thereby permitting said object to be seen through from the outside and at the same time protecting it from exterior impacts so as to be fit for long service.

Furthermore it is another object of the invention to provide luncheon mats wherein the base member and the plastic sheet are thermally adhered together without using any binding agent.

It is further another object of the invention to provide luncheon mats wherein any desired designs are printed on the thermally adhered portions.

Further it is also another object of the invention to provide luncheon mats that in synchronism with the thermal adhesion the contour of the manufactured goods is thermally cut together with the thermoplastic resin strings or threads so as to secure much low-cost manufacutre.

BRIEF DESCRIPTION OF THE DRAWING

The invention will now be set forth to greater detail with reference to embodiments thereof shown, by way of example, in the accompanying drawings, wherein;

FIG. 7 is extensively explanatory in vertical section of the thermally adhered portion in FIG. 6, and FIG. 8 is a plan view partially showing a luncheon mat embodied in another method of the invention.

DETAILED DESCRIPTION OF THE INVENTION

Now accounting for the thermoplastic resin luncheon mat with reference to the accompanying drawings, in which, reference (a) designates a base member shaped to form an ornamental screen substantially constituting an inter lining of the luncheon mat of the invention.

Figure 1:
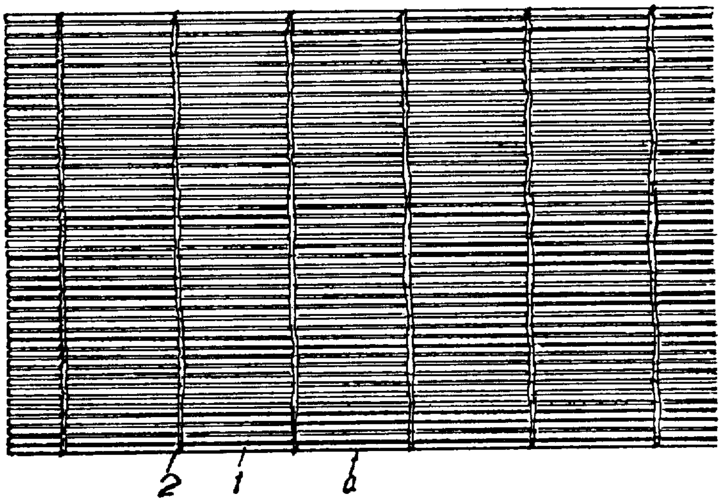
FIG. 1 is a plan view showing a base member (a) formed with a plurality of hollow or solid rods made from a thermoplastic resin material which are arranged in a row and fastened closely one above another.
Figure 5:
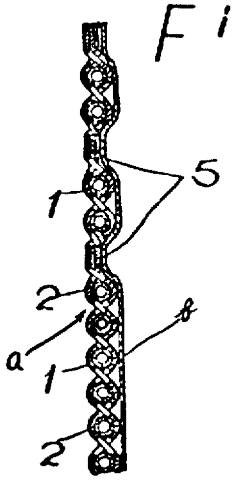
FIG. 5 is extensively explanatory in vertical section of the thermally adhered portion in FIG. 4.

The base member or ornamental screen (a) comprises a plurality of hollow or solid rods 1 of 1 mm to 1.5 mm in diameter which are made from a conventional thermoplastic resin material such for example as vinyl chloride resin or polyethylene resin. The plurality of rods 1 are drawn up in a line at regularly spaced apart intervals and fastened one above another to form such a shape as is shown in FIG. 1. However, such a shape is not altogether restrictive since any number of modifications and changes may be made. Therefore, this formation of the base member (a) is made possible when the plurality of rods 1 are fastened one above another as has been mentioned by a conventional rod-fastening device with strings or threads made from a thermoplastic resin material 2 especially like a vinyl chloride resin or a synthetic resin of vinyl chloride system which has a property of being stuck to the rods 1 in heat treatment. As shown in FIG. 5, the threads or strings 2 are interwoven with the rods 1 to form a screen-like structure in order to secure the rods 1 in place.

Figure 2:
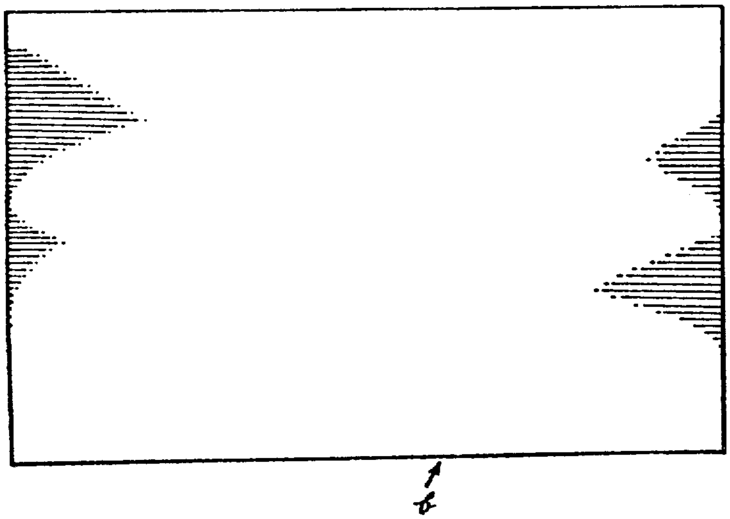
FIG. 2 is a plan view of a thermoplastic resin sheet (b)

Reference (b) in FIGS. 2, 5 and 7 designates a thermoplastic resin sheet consisting of a vinyl chloride resin or the like which is to cover either one or two sides of the base member (a).

The plastic sheet (b) includes a plasticizer of 20 – 30 H.P.R. against a resin, being normally 0.3 – 0.5 mm thick in the form for example of a transparent of semi-transparent rectangular shape as is shown in FIG. 2. However, this shape is not altogether restrictive since any number of modifications and changes may be made.

Figure 3:
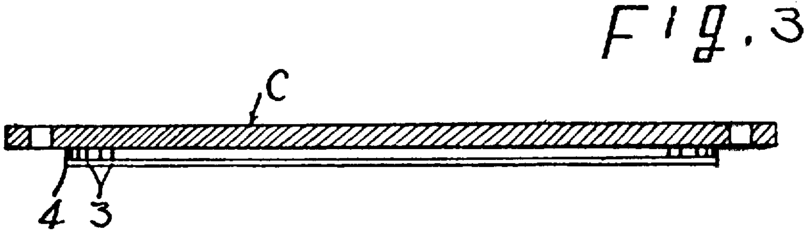
FIG. 3 is a vertical section view of a mold seated on a high frequency-welder.

In the following process, the plastic sheet (b) is laid on the base member (a) and thereafter, any predetermined portions of the superimposed sheet and object are thermally adhered together when in synchronism the marginal portions of the adhered portions are thermally cut off under pressure by means of a high frequency-welder having an output of 10 – 15 KW provided with a mold (c) sized for example by 30 × 45 Cm as is shown in FIG. 3.

For a fuller understanding, the welder C is provided near the periphery thereof with pressing members 3 projected downward, each of the pressing members being provided thereon with a different design pattern or otherwise a plurality thereof forming various design patterns.

Further in the outside of the pressing members 3 the welder C is provided with cutting members 4 projected substantially more downward than the pressing members 3 so as to thereby define the contour of a luncheon mat. The foremost end of each cutting member 4 is made sharpened.

When the superimposed base member (a) and sheet (b) are pressed by means of the pressing members 3 and electrified, they are thermally adhered together in predetermined portions and at the same time the marginal portions of the adhered portions positioned outside the cutting members 4 are thermally cut off by means of the cutting members 4.

Figure 4:
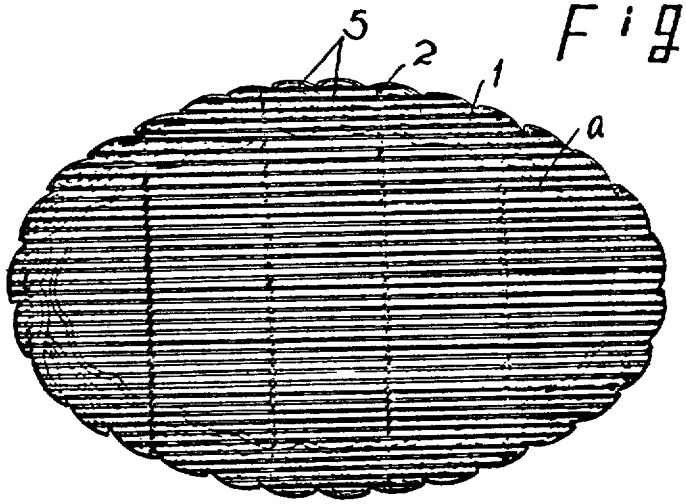
FIG. 4 is a plan view of a luncheon mat manufactured in accordance with the invention.

In FIGS. 4 and 5 there is shown a luncheon mat from which the marginal portions were clearly removed. As is evident in FIGS. 4 and 5, the portions 5 thermally adhered by the pressing members 3 are three-dimensionally decorated with various designs. The thermoplastic resin strings 2 or threads used for forming part of the base member (a) are thermally cut off in the thermally glued portions 5.

Incidentally, referring to a conventional method for forming a base member for example by fastening a plurality of rods one above another with strings or threads made from natural fibers, it is impossible to cut off these strings or threads even if the abovementioned high frequency-welder C is effectively applied to press the same for cutting so that workers have to trim off these strings one after another with a knife or scissors.

However, according to the method of this invention wherein thermoplastic resin strings 2 or threads are employed in place of conventional strings, it is quite possible to thermally cut off these strings at one time and further thermally adhere the base member (a) and the plastic sheet (b) in an incorporated relation with each other so that each cut section of the strings is neatly trimmed and the sticking effect of the adhered portions is conspicuously enhanced.

Now another embodiment of the invention will be set forth in detail with reference to FIGS. 6 and 7.

Figure 6:
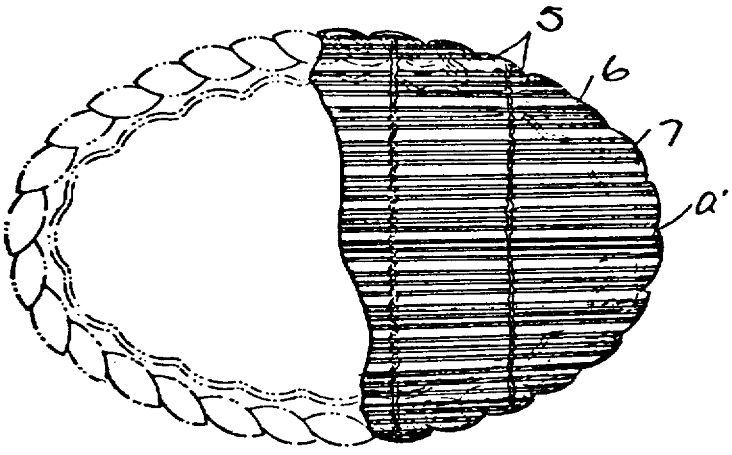
FIG. 6 is a plan view partially showing a luncheon mat embodied in another method of the invention.

The present embodiment and the above-mentioned embodiment are apparently different from each other in the shape of rods for forming the base member and the position of thermoplastic resin sheet in relation to the rods; in the present embodiment there are employed a plurality of rods 6 smaller in diameter and a plurality of rods 7 larger in diameter, both of which rods are assorted in such a suitable manner as shown in FIGS. 6 and 7 thereby to form a base member *a'* and thereafter each thermoplastic resin sheet *b* is laid on both sides of the member *a'*. However, except only for the above-mentioned differences, manufactured goods can be obtained in the same manner as the preceding embodiment.

The advantage with the present embodiment is that thanks to the use of larger diameter rods and thermoplastic resin sheets *b* on both the surface and reverse of the member *a '*, there can be obtained more sturdy goods than in the preceding embodiment. In addition to that, it is also possible to properly use the manufactured goods in two ways by dyeing both sides thereof in two different kinds of color.

In the following, another embodiment of the invention will be set forth in detail with respect to FIG. 8.

This embodiment is different from the others disclosed hereinbefore in that the plurality of rods are constructed to form a base member (*c*) having a different configuration than the members *a* or *a'* referred to in the preceding embodiments with respect to FIGS. 4 to 5 or 6 to 7. However, except only for this difference, the manufactured goods can be obtained in the same manner as the preceding embodiments.

Further if each surface of the base members *a*, *a'* and the base member c is printed with any desired designs (not shown), then it would also be possible to obtain the manufactured goods far richer in ornamental effect than those shown in FIGS. 4 to 5 or 6 to 7.

Since the thermoplastic resin luncheon mats of the present invention are produced in the above-mentioned manner, the transparent or semi-transparent plastic sheet *b* serves to protect the members a, *a'* or c from exterior impacts so as to be obviated from being damaged however long they made be used. In addition to that, the decorative designs of the object can be seen through the transparent sheet b thereby enhancing the ornamental effect to the highest extent.

As has been mentioned, the members *a*, *a'* or *c* are thermally adhered to said plastic sheet *b* in an incorporated relation and at the same time thermally cut off in each contour portion of the manufactured goods while the marginal portions are clearly removed from the glued portions whereby the process of manufacture is extremely simplified as against the conventional one, resulting in supplying much low-cost manufacture.

Furthermore, it is also possible to provide any desired designs three-dimensionally on the surface of the adhered portions by freely modifying the assortments of each straight or curved line along which the object and the sheet are thermally adhered together.

Since the luncheon mats of this invention are constructed with the members a, a' or c of sturdy and durable quality as have been mentioned, they are intrinsically thick and heavy enough to be easy to use and fit for long service compared with the conventional ones constructed with the surface thereof consisting of a synthetic resin sheet and with the reverse thereof consisting of a rubber sheet or a blistered synthetic resin sheet.

If a plurality of hollow rods or pipes are adapted to construct the members a, a' or c in the embodiment of this invention, air is hermetically sealed within the pipes in a water-tight condition when the contour portions thermally cut off thereby making it possible to give to the manufactured goods such elasticity that works as a cushion against exterior impacts and such hygienic effect that no water is permitted to permeate into the pipes and remain sealed therein when the manufactured goods are washed in water.

In this case, being air-sealed in a water-tight condition as have been mentioned, the pipes serve to construct the luncheon mats that are materially light in weight and yet apparently thick and heavy.

Last but not least, the methods of the present invention are not so limited to the embodiments disclosed herein since the same results as the disclosed methods can be obtained for example by means of a sheet seal pressing device in place of a high frequency-welder and also since the modifications and changes of the disclosed embodiments may be made without departing the purview and spirit of the appended claims.

The embodiments of the invention in which an exclusive property or privilege is claimed are defined as follows:

1. A method of producing thermoplastic resin mattings with contoured surfaces comprising a base material consisting of a plurality of resilient thermoplastic resin rods in closely spaced parallel relationship with each other in a single layer and a plurality of thermoplastic resin threads extending transversely of said rods and disposed at spaced intervals along the length of said rods, and a transparent synthetic thermoplastic resin sheet, said method comprising interweaving said thermoplastic resin threads with said thermoplastic resin rods so that the thermoplastic resin threads completely encircle the thermoplastic resin rods at their points of contact and thereby form said base material, superimposing said transparent synthetic thermoplastic resin sheet on said base material, applying heat and pressure at specific corresponding points on said base material and said transparent synthetic thermoplastic resin sheet for thermally adhering them together, said step of applying heat and pressure comprising forming contoured surfaces at said specific points so as to create an ornamental design thereon, and cutting those portions of the base material and thermoplastic resin sheet extending a specific distance outwardly from said specific points so as to form the outer edge of said mattings.

2. The method according to claim 1, wherein said step of cutting is concurrent with said step of applying heat and pressure.

3. A method of producing thermoplastic resin mattings with contoured surface comprising a base material consisting of a plurality of hollow resilient synthetic thermoplastic resin rods in closely spaced parallel relationship with each other in a single layer and plurality of thermoplastic resin threads extending transversely of said rods and disposed at spaced intervals along the length of said rods, and a transparent synthetic thermolastic resin sheet, said method comprising interweaving said thermoplastic resin threads with said thermoplastic resin rods so that the thermoplastic resin threads completely encircle the thermoplastic resin rods at their points of contact and thereby form said base material, superimposing said thermoplastic resin sheet on said base material, applying heat and pressure at specific, corresponding points on said base material and said transparent synthetic thermoplastic resin sheet for thermally adhering them together, said step of applying heat and pressure comprising hermetically sealing the ends of said hollow rods of said base material so as to entrap air contained therein and provide a cushion for the matting, and cutting those portions of the base material and thermoplastic resin sheet extending a specific distance outwardly from said specific points so as to form the outer edge of said mattings.

4. The method according to claim 3 wherein said step of applying heat and pressure comprised forming contoured surfaces at said specific points so as to create an ornamental design thereon.

5. The method according to claim 1, wherein said step of interweaving said resin threads with said rods comprises alternating rods of one diameter with rods of a different diameter.

* * * * *